US012687219B2

(12) United States Patent　　　　(10) Patent No.: US 12,687,219 B2
Ebke et al.　　　　　　　　　　　　　(45) Date of Patent: Jul. 21, 2026

(54) ROTATION STOP DEVICE

(71) Applicant: Rollax Gmbh & Co. KG, Bad
　　　　　　　Salzuflen (DE)

(72) Inventors: Andreas Ebke, Bad Salzuflen (DE);
　　　　　　　Tatjana Korent, Bad Salzuflen (DE)

(73) Assignee: Rollax GmbH & Co. KG, Bad
　　　　　　　Salzuflen (DE)

( * ) Notice:　Subject to any disclaimer, the term of this
　　　　　　　patent is extended or adjusted under 35
　　　　　　　U.S.C. 154(b) by 0 days.

(21) Appl. No.: 19/213,997

(22) Filed:　May 20, 2025

(65)　　　　Prior Publication Data

US 2025/0369504 A1　　Dec. 4, 2025

(30)　　　Foreign Application Priority Data

May 28, 2024　(DE) ..................... 20 2024 102 761.2

(51) Int. Cl.
　　*F16H 25/20*　　　　(2006.01)

(52) U.S. Cl.
　　CPC . *F16H 25/2015* (2013.01); *F16H 2025/2031*
　　　　　　　(2013.01); *F16H 2025/204* (2013.01)

(58) Field of Classification Search
　　CPC ....... F16H 2025/204; F16H 2025/2031; F16H
　　　　　　　　　　　　　　　　　　　　25/2015
　　See application file for complete search history.

(56)　　　　　　References Cited

FOREIGN PATENT DOCUMENTS

DE　　　102020126785 A1 *　4/2021　............. B62D 5/001

* cited by examiner

*Primary Examiner* — Randell J Krug
(74) *Attorney, Agent, or Firm* — WTA IP Law P.C.

(57)　　　　　　ABSTRACT

A rotation stop device for a rotatably mounted shaft, having
a stationary stop body and a transmission which converts the
rotational movement of the shaft into a linear movement of
a driven element relative to the stop body, and having a stop
element which can be moved by the driven element into a
stop position in which it bears against the stop body. The
stop element is coupled to the shaft in a rotationally fixed
and axially displaceable manner by a linear guide.

11 Claims, 3 Drawing Sheets

ROTATION STOP DEVICE

CROSS-REFERENCE TO RELATED APPLICATION

This application claims priority to German Patent Application No. 20 2024 102 761.2 filed on May 28, 2024, which is incorporated by reference herein in its entirety.

BACKGROUND

The invention relates to a rotation stop device for a rotatably mounted shaft, having a stationary stop body and a transmission which converts the rotational movement of the shaft into a linear movement of a driven element relative to the stop body, and having a stop element which can be moved by the driven element into a stop position in which it bears against the stop body.

Such a rotational stop device is known from DE 10 2020 126 785 U1, in which the stop element is a spring element which is held non-rotatably on the shaft and is elastically deflected into the stop position by the driven element when the end of the range of motion of the driven element is reached. The fact that the stop blocks the rotational movement of the shaft in this way limits the mechanical load to which the transmission is subjected at the moment of hitting the stop body.

SUMMARY

It is an object of the invention is to provide a rotation stop device that can withstand higher torques.

According to the invention, this object is achieved by coupling the stop element to the shaft in a rotationally fixed and axially displaceable manner by means of a linear guide.

The linear guide stabilizes the stop element and reduces the bending moment acting on this stop element during impact.

Advantageous embodiments and further embodiments of the invention are given in the sub-claims.

In one embodiment, the transmission is a spindle drive with a spindle seated fixedly on the shaft and a nut, which is in threaded engagement with the spindle, as the driven element.

The stop body can be arranged on or in an end wall of a housing that accommodates the transmission. The stop element can be arranged axially displaceable on the spindle so that it can be displaced by the driven element, i.e. the spindle nut, in the direction of the stop position. The stop element can have one or more projections that are guided in the linear guide and whose free ends strike against an associated stop body in the stop position. The linear guide can be formed by a guide disk that is wedged onto the shaft in a rotationally fixed manner and has openings in which the projections are precisely guided. In this case, the torque is mainly or even exclusively (if the stop element itself is not held non-rotatably on the spindle) transmitted to the stop element through the guide disk. The axial distance between the guide disk and the stop elements can be kept relatively small so that no high bending moment acts on the projections.

A spring element can be arranged between the stop element and the guide disk, which spring element elastically pretensions the stop element in the direction of the driven element so that the stop element is safely released from the stop position when the driven element moves away from the stop bodies. At the same time, the spring element can be used to limit the distance by which the stop element can move away from the guide disk.

Optionally, each stop element can be associated with a ramp surface that is adjacent to the stop element in the circumferential direction and rises at least to the level of the stop element. When the stop element is rotated in the direction opposite to the stopping direction, the free ends of the projections run onto the ramp surfaces and are thus pushed away from the stop bodies at least far enough to move freely past the stop bodies. If the stop element is then rotated again in the opposite direction, the projections will not hit the stop bodies again until the stop element has been moved back in the stop direction by the driven element. In this way, the function of the rotation stop device can be maintained even if the spring element breaks.

BRIEF DESCRIPTION OF THE DRAWINGS

An embodiment example will be explained in more detail below with reference to the drawing, wherein.

DETAILED DESCRIPTION

Figure 1:
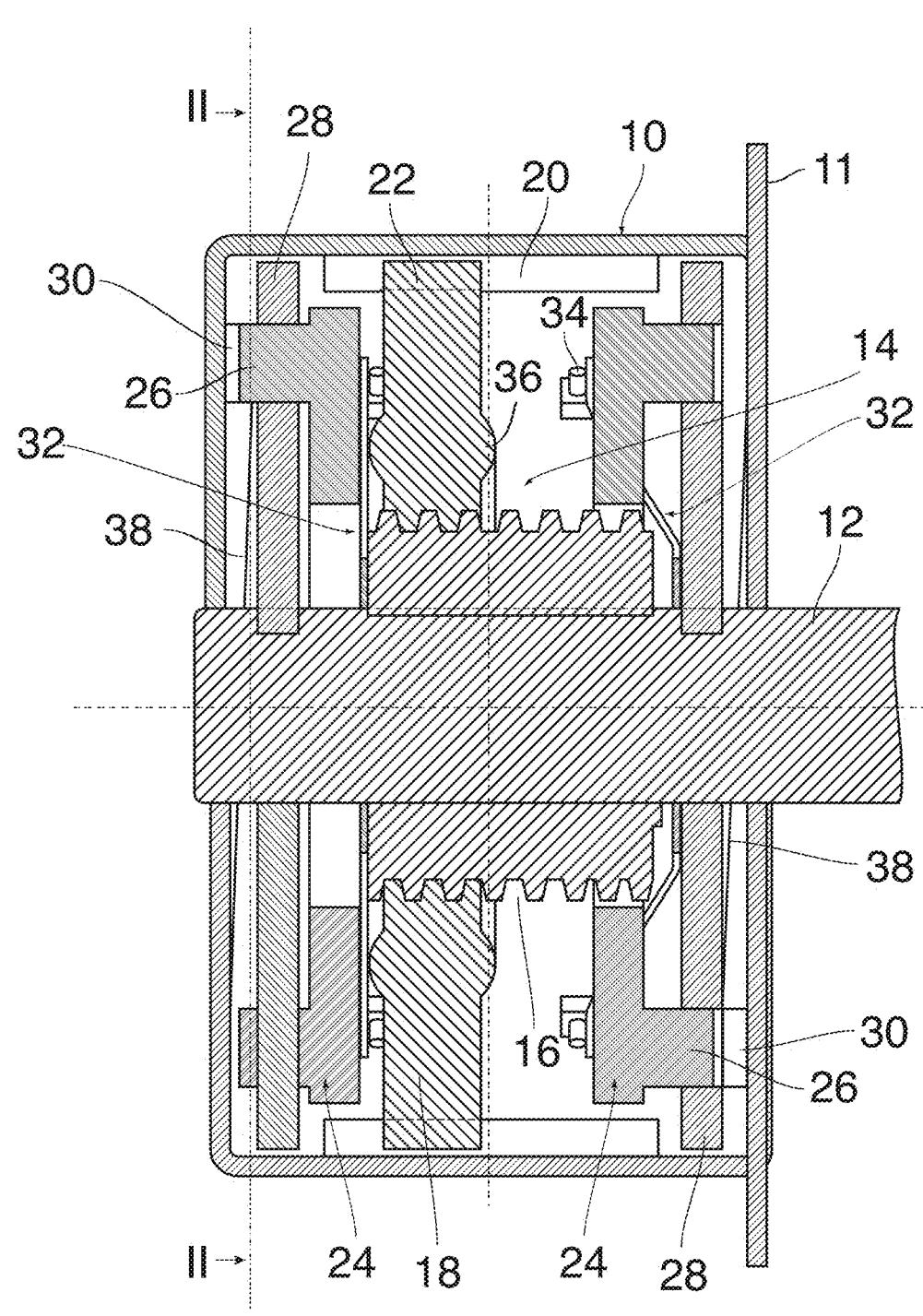
FIG. 1 is an axial section through a rotation stop device according to the invention in a first stop position.

The rotation stop device shown in FIG. 1 has a pot-shaped housing 10, which is closed by a cover 11 and through which a rotatably mounted shaft 12 passes coaxially. The housing 10 accommodates a transmission 14, which is formed by a spindle 16 firmly keyed onto the shaft 12 and a nut in threaded engagement with the spindle as a driven element 18.

The housing 10 has two guide strips 20 on the inner surface of its circumferential wall, which are embraced by fork-shaped projections 22 that project from the outer circumferential edge of the driven element 18. In this way, the driven element 18 is prevented from rotating relative to the housing 10, while axial movement is permitted.

On both sides of the driven element 18, two mutually mirror-image stop elements 24 are arranged on the spindle 16, each of which has two diametrically opposed projections 26. The projections 26 of each stop element engage through openings of a guide disk 28, which is keyed to the shaft 12 in a rotationally fixed manner. The projections 26 are guided in the openings of the guide disk 28 with the least possible play, so that a linear guide is formed for movement of the stop elements 24 in the axial direction of the shaft 12. Two stop bodies 30 are arranged on the bottom of the housing 10 and on the cover 11 respectively, which form stops for the free ends of the projections 26 in one direction of rotation of the shaft 12 and the stop elements 24.

In FIG. 1, the left of the two stop elements 24 is in its stop position, in which the projections 26 are in contact with the stop bodies 30. On the left-hand side, only the upper stop element 30 can be seen, which is located behind the associated projection 26. The other stop body is located on the front side of the sectional plane in FIG. 1 and is therefore not visible.

On the right-hand side in FIG. 1, the stop elements 30 are arranged in such a way that they limit the rotational movement of the unit consisting of shaft 12, spindle 16, stop elements 24 and guide disks 28 in the opposite direction.

Each of the two guide disks 28 is provided with a spring element 32 which surrounds the shaft 12 with an annular base and has six radially projecting arms which pre-tension the associated stop element 24 in the direction away from the guide disk 28. The arms of the spring elements 32 are arranged at an angle offset from radial arms of the guide disks 28 that carry the projections 26. The stop element 24 at the right side of FIG. 1 is held by the spring element 32 in a position in which the projections 26 are retracted into the openings of the guide disk 28, so that they cannot strike against the stop bodies 30. In the view in FIG. 1, the arms of the spring element 32 are partially covered by the arms of the guide disk 28. Retaining pins 34 are attached to the stop element 24 in such a way that, together with the base of the stop element, they form six insertion pockets in which the free ends of the arms of the spring element 32 engage. In this way, the stop element 24 is held by the spring element 32 in the axial position in which the spring element is relaxed.

On the inside of the cover 11, FIG. 1 shows a ramp 38 that runs in the circumferential direction and rises towards the stop body 30 and adjoins it in the circumferential direction.

A further spring element 32 and a further ramp 38 are also present in mirror image on the left-hand side in FIG. 1. On the left-hand side in FIG. 1, the stop element 24 is held in its stop position by the spring element 32. The spring element 32 is supported on a bead 36 of the driven element 18 and is thus held in a tensioned, flattened configuration.

Figure 2:
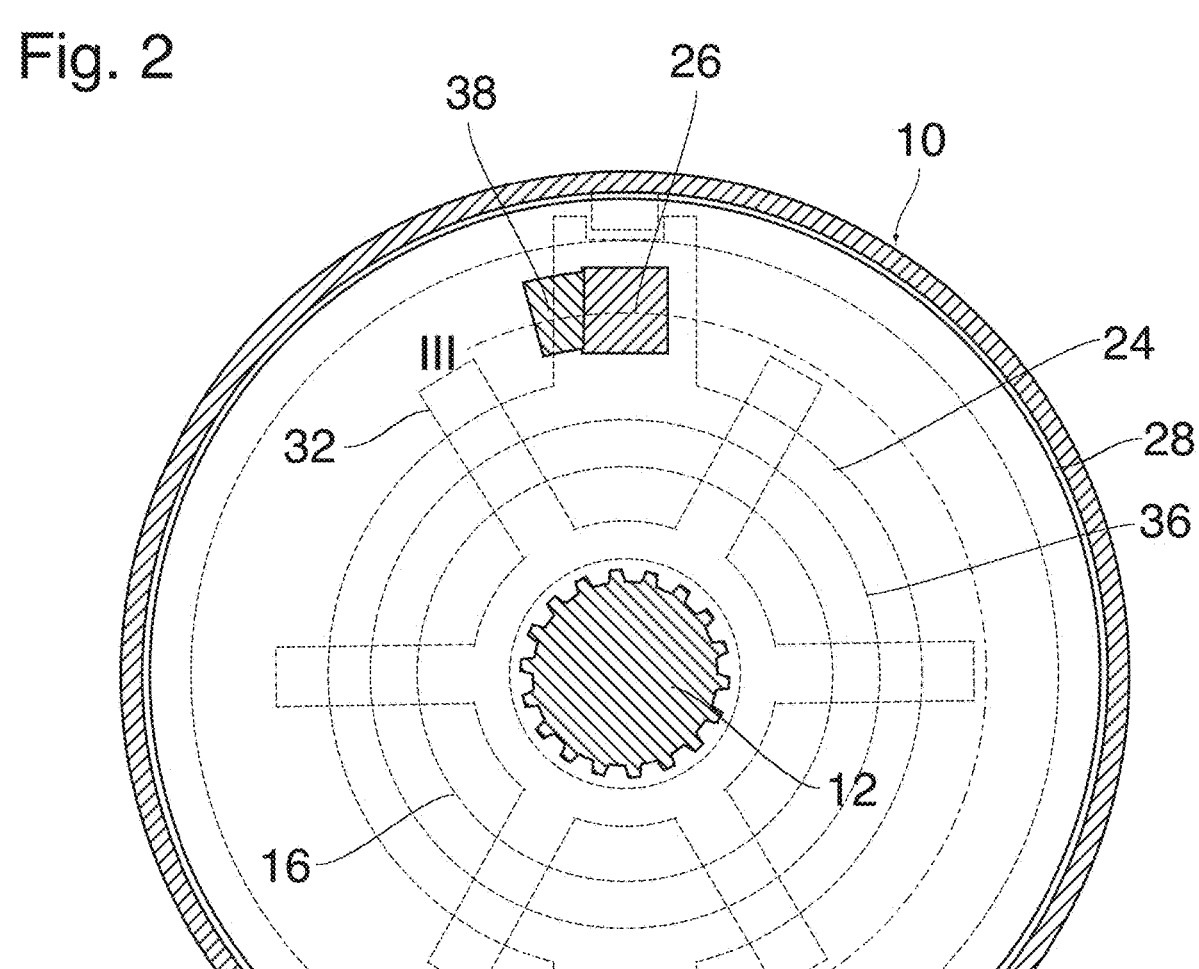
FIG. 2 is a section along line II-II in FIG. 1.

FIG. 2 shows the device in a sectional view along line II-II in FIG. 1. The sectional plane passes through the two projections 26 and the parts of the ramps 38 directly adjacent to them. All other components inside the housing are covered by the guide disk 28 keyed onto the shaft 12 and are therefore only indicated by dashed lines in FIG. 2. In particular, one can see the six arms of the spring element 32 as well as the outline shape of the driven element 18 with the fork-shaped projections 22, which embrace the guide strips 20. The apex of the bead 36 is also shown.

Figure 3:
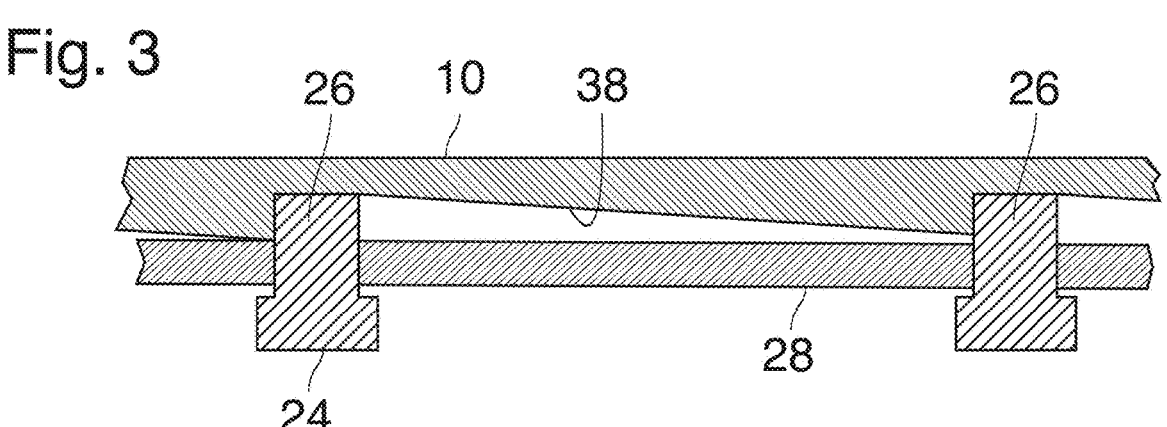
FIG. 3 is an unfolding of a section along line III-III in FIG. 2.

In FIG. 3, the shape of one of the ramps 38 can be seen in a development.

Figure 4:
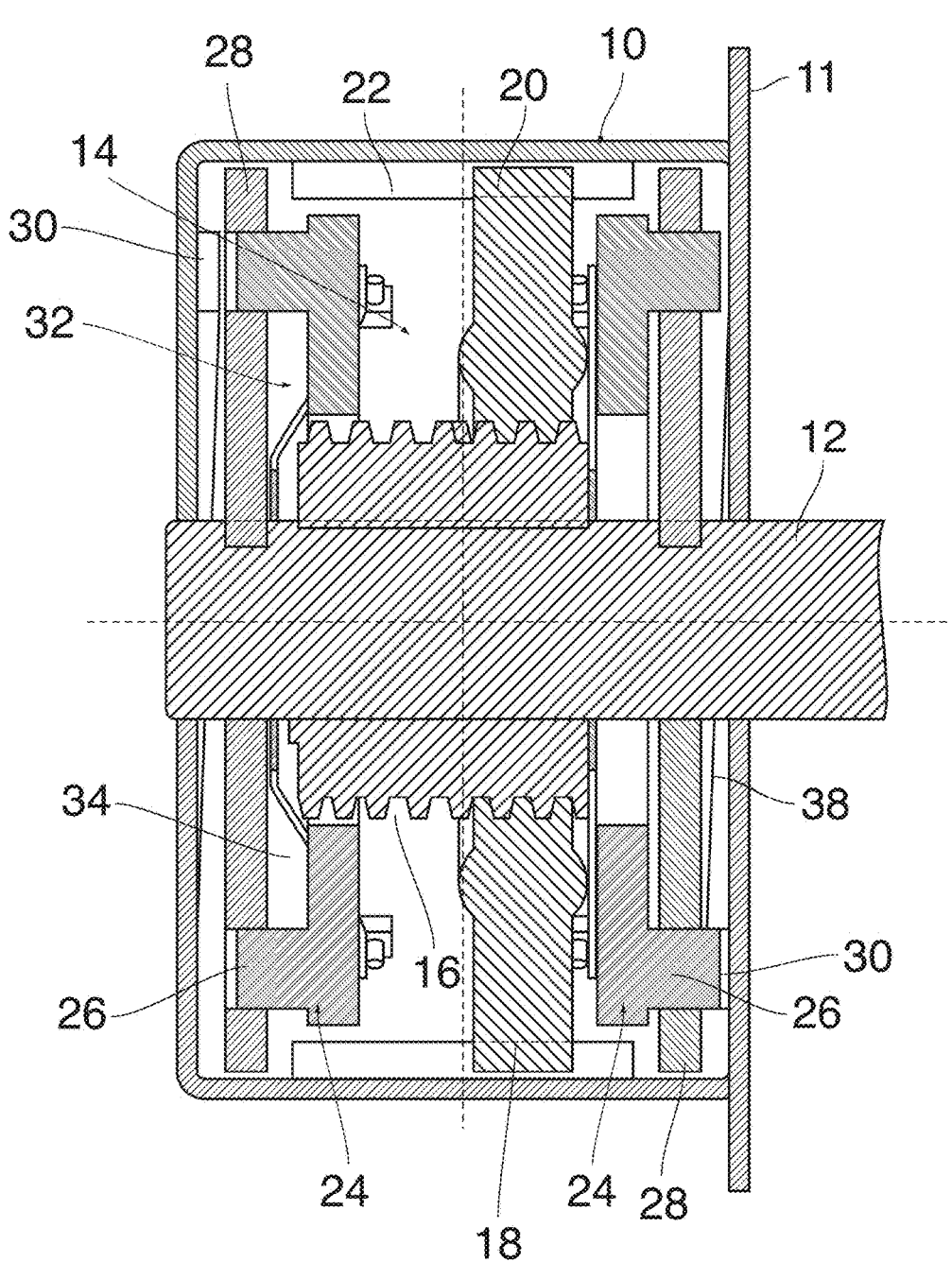
FIG. 4 an axial section through the rotation stop device in an opposite second stop position.

FIG. 4 shows the device in the same sectional view as in FIG. 1, but in a state in which the driven element 18 has been moved by the spindle 16 to the opposite end of this spindle and now holds the spring element 32 on the right in FIG. 4 and the right stop element 24 connected to it in the stop position for the corresponding opposite direction of rotation. The stop elements 30 limit the rotation in the direction in which the lower projection 26 moves away from the viewer.

If the shaft is turned in the direction opposite to the stop direction in the state shown in FIG. 4, the projections 26 of the right-hand stop element 24 detach from the stop bodies 30 and run onto the ramps 38. As a result, the stop element is also moved away from the guide disk 28 independently of the action of the spring element 32, so that the projections 26 retract into the openings of the guide disk. The slope of the ramp 38 is dimensioned so that the axial movement of the stop element 24 is not faster than the axial movement of the driven element 18. The right-hand spring element 32 returns to its relaxed position (FIG. 1) and supports the movement of the stop element.

As the spindle continues to rotate, the left stop element 24 is brought back into its stop position by the bead 36 of the driven element 18 pressing centrally on the arms of the spring element 32, and these push the stop element 24 to the left with their free ends against the spring force until the condition shown in FIG. 1 is finally reached again.

The leverage ratio on the spring element 32 is dimensioned so that the contact radius of the bead 36 of the driven element 18 and the contact radius on the stop element 24 are approximately in a ratio of 1:2, thus generating a significant increase in stroke on the stop element. (1 mm axial bead movement generates 2 mm axial travel of the stop element).

The rotation stop device shown here can be used, for example, as a steering stop in a vehicle with steer-by-wire steering and also wherever a rotational movement that involves more than one revolution (360°) needs to be limited. In the case of the steering stop, the shaft 12 is the steering shaft and the housing 10 is positively coupled in the direction of rotation to a steering system housing of the vehicle, which is not shown. The rotation stop device then prevents the steering shaft from being rotated endlessly in one and the same direction, which would lead to overstressing of the electrical cables that connect the switches arranged on the steering wheel to stationary vehicle components.

In a modified embodiment, not shown, an impact absorber can be provided between the stop bodies 30 and the projections 26, for example in the form of a specially shaped spring body or a metallic cushion, which absorbs the impact when the stop position is reached.

What is claimed is:

1. A rotation stop device for a rotatably mounted shaft comprising:
   a stationary stop body and a transmission which converts a rotational movement of the shaft into a linear movement of a driven element relative to the stop body, and
   a stop element which can be moved by the driven element into a stop position in which it bears against the stop body,
   wherein the stop element is coupled to the shaft in a rotationally fixed and axially displaceable manner by means of a linear guide.

2. The rotation stop device according to claim 1, wherein each stop body is provided with a ramp which is sloped along a circumferential direction and on which a part of the stop element rides when rotating in a direction opposite to the stop direction.

3. The rotation stop device according to claim 1, wherein at least two stop elements and two stop bodies are arranged such that a rotation stop is formed in each direction of rotation.

4. The rotation stop device according to claim 1, wherein a respective impact absorber is integrated between the stop bodies and projections, wherein the absorber absorbs energy upon impact of the stop element with the projections on the stop bodies.

5. The rotation stop device according to claim 1, wherein the transmission is a spindle transmission with a spindle seated non-rotatably on the shaft, and a nut in threaded engagement with the spindle as the driven element.

6. The rotation stop device according to claim 5, wherein the transmission is accommodated in a housing in which the driven element is guided in a rotationally fixed but axially movable manner and at an end wall of which the stop body is formed.

7. The rotation stop device according to claim 1, further comprising a spring element that biases the stop element into its stop position.

8. The rotation stop device according to claim 7, wherein the driven element has an annular bead which engages on lever arms of the spring element, which in turn engage with their ends on the stop element, so that a stroke of the stop element increases in accordance with a leverage ratio.

9. The rotation stop device according to claim 1, wherein the linear guide is formed by a guide disk which is non-rotatably wedged onto the shaft and provides guidance for an axial projection of the stop element.

10. The rotation stop device according to claim 9, wherein the guide disk has an opening through which the projection engages.

11. The rotation stop device according to claim 9, wherein the stop element has a plurality of axial projections, wherein a stop body is assigned to each of the axial projections.

\* \* \* \* \*